United States Patent
Niimi et al.

(10) Patent No.: US 6,799,801 B2
(45) Date of Patent: Oct. 5, 2004

(54) SEAT DEVICE

(75) Inventors: Naoki Niimi, Kariya (JP); Hiroyuki Okazaki, Chiryu (JP); Shin Shiraki, Kakamigahara (JP)

(73) Assignees: Aisin Seiki Kabushiki Kaisha, Kariya (JP); Gifu Shatai Kogyo Kabushiki Kaisha, Kakamigahara (JP)

(*) Notice: Subject to any disclaimer, the term of this patent is extended or adjusted under 35 U.S.C. 154(b) by 0 days.

(21) Appl. No.: 10/326,409

(22) Filed: Dec. 23, 2002

(65) Prior Publication Data

US 2003/0127898 A1 Jul. 10, 2003

(30) Foreign Application Priority Data

Dec. 25, 2001 (JP) ........................................ 2001-391883

(51) Int. Cl.[7] .................................................. B60N 2/02
(52) U.S. Cl. .................. 297/378.12; 297/366; 297/369; 297/367
(58) Field of Search ................................. 292/123, 125, 292/223, 225; 297/378.12, 370, 366, 369

(56) References Cited

U.S. PATENT DOCUMENTS

| | | | | |
|---|---|---|---|---|
| 3,958,828 A | * | 5/1976 | Ishida et al. | 297/361.1 |
| 4,504,091 A | * | 3/1985 | Ohshiro | 297/362 |
| 4,634,180 A | | 1/1987 | Zaveri et al. | |
| 4,645,263 A | * | 2/1987 | Fourrey et al. | 297/366 |
| 4,717,204 A | * | 1/1988 | Tezuka | 297/362 |
| 4,770,463 A | * | 9/1988 | Nishino | 297/367 |
| 5,310,247 A | | 5/1994 | Fujimori et al. | |
| 5,322,346 A | * | 6/1994 | Notta et al. | 297/367 |
| 5,588,705 A | * | 12/1996 | Chang | 297/367 |
| 5,626,392 A | | 5/1997 | Bauer et al. | |
| 5,664,837 A | * | 9/1997 | Takagi | 297/367 |
| 5,810,443 A | | 9/1998 | Blanchard | |
| 5,927,809 A | | 7/1999 | Tame | |
| 6,030,042 A | | 2/2000 | Bauer et al. | |
| 6,092,874 A | * | 7/2000 | Kojima et al. | 297/367 |
| 6,106,067 A | * | 8/2000 | Zhuang et al. | 297/361.1 |
| 6,488,338 B1 | * | 12/2002 | Hoshihara | 297/367 |

FOREIGN PATENT DOCUMENTS

| | | |
|---|---|---|
| DE | 43 09 301 C2 | 3/1993 |
| DE | 195 10 618 A1 | 3/1995 |
| DE | 197 25 365 A1 | 6/1997 |
| EP | 0 878 344 A2 | 11/1998 |
| FR | 2 742 708 A1 | 6/1997 |
| WO | WO 99/38723 A1 | 8/1999 |

* cited by examiner

Primary Examiner—Peter M. Cuomo
Assistant Examiner—Erika Garrett
(74) Attorney, Agent, or Firm—Burns, Doane, Swecker & Mathis, L.L.P.

(57) ABSTRACT

A seat device equips a walk-in mechanism and a fold down mechanism (a seatback is turned down with large angle so as to attain the flat condition). These mechanisms can be operated selectively using a simple operation without using plural levers. A base bracket of the seat device is fixed to a lower arm. The base bracket has a stopper and pivotally supports the first link member and the second member in a freely turning way. An upper arm has a contact portion. If the upper arm is turned down in the forward direction for the walk-in operation, the contact portion gets in contact with an intervening member of the first link member so as not to turn further down in the forward direction. In the case that the seatback is turned to the flat condition, the intervening member is moved towards the outside portion of the locus of movement of the contact portion. Consequently, the contact portion of the upper arm can be turned down on a large scale without getting in contact with the intervening member.

19 Claims, 9 Drawing Sheets

SEAT DEVICE

CROSS REFERENCE TO RELATED APPLICATION

This application is based on and claims priority under 35 U.S.C. § 119 with respect to Japanese Application No.2001-391883 filed on Dec. 25, 2001, and the entire content of which is incorporated herein by reference.

FIELD OF THE INVENTION

This invention generally relates to a vehicle seat device equipped with a walk in mechanism.

BACKGROUND OF THE INVENTION

This invention generally relates to a seat device having a fold down mechanism (turning down mechanism of a seatback in the forward direction over a seat cushion) and a walk-in mechanism.

Conventionally, a walk-in mechanism is installed in a seat device of two-door type vehicle. The walk-in mechanism works to unlock a lock mechanism of a seat position adjusting mechanism of the front seat, when a seatback of a front seat is turned forward. And the front seat is released to move in forward direction for making an entry of a passenger on to or off from the rear seat easy.

Also for the seat device of a two-door type vehicle, the fold down mechanism is installed. The fold down mechanism works to make the back surface of the front seat back on the same height level with the baggage storage space, and a rear space of vehicle be utilized easily for baggage storage. The cushion of a front seat is turned up and moved forward around a hinge of the front portion thereof, then the seatback of the front seat is forwardly turned down to the space where the cushion was.

An example of a seat device equipped with these mechanisms is disclosed in a PCT international publication number WO 99/38723. This publication discloses the first lever for operating the walk-in mechanism and the second lever for operating the fold down mechanism. Accordingly, the levers are selected and operated according to the each function.

In the conventional seat device described above, since the two levers have to be operated for the walk-in and the fold down mechanism selectively, operation miss may happen. Once such operation miss happens, restoring the cushion and the seatback position to a normal position is made to be difficult.

Therefore, the object of the present invention is to solve the inconvenient operation of the conventional technology by utilizing one operational lever and to avoid the aforementioned drawback.

SUMMARY OF THE INVENTION

The present invention is related with a seat device including an upper arm which can be turned in forward and backward directions around a lower arm, comprising contact portion provided in said upper arm, base bracket fixed to said lower arm and having a stopper, first link member pivotally supported by said base bracket and having an intervening portion, and an activating member for activating said first link member, wherein the intervening portion provided on the first link member is moved within a locus of movement of said contact portion when a walk-in operation is performed and the intervening portion is moved out from the locus of said movement by activating the activating member when a seatback is turned down in forward direction with large angle.

In accordance with the present invention, an activating member can move the intervening portion towards within or out of the locus of movement of the contact portion by operating a lever or engagement with the cushion. The position of the upper arm can be easily selected in accordance with the walk-in or fold down operation.

BRIEF DESCRIPTION OF THE DRAWING

The foregoing and additional features and characteristics of the present invention will become more apparent from the following detailed description considered with reference to the accompanying drawing Figures wherein.

DESCRIPTION OF THE PREFERRED EMBODIMENTS

The embodiment of the present invention is explained hereinafter with reference to drawings.

Figure 1:
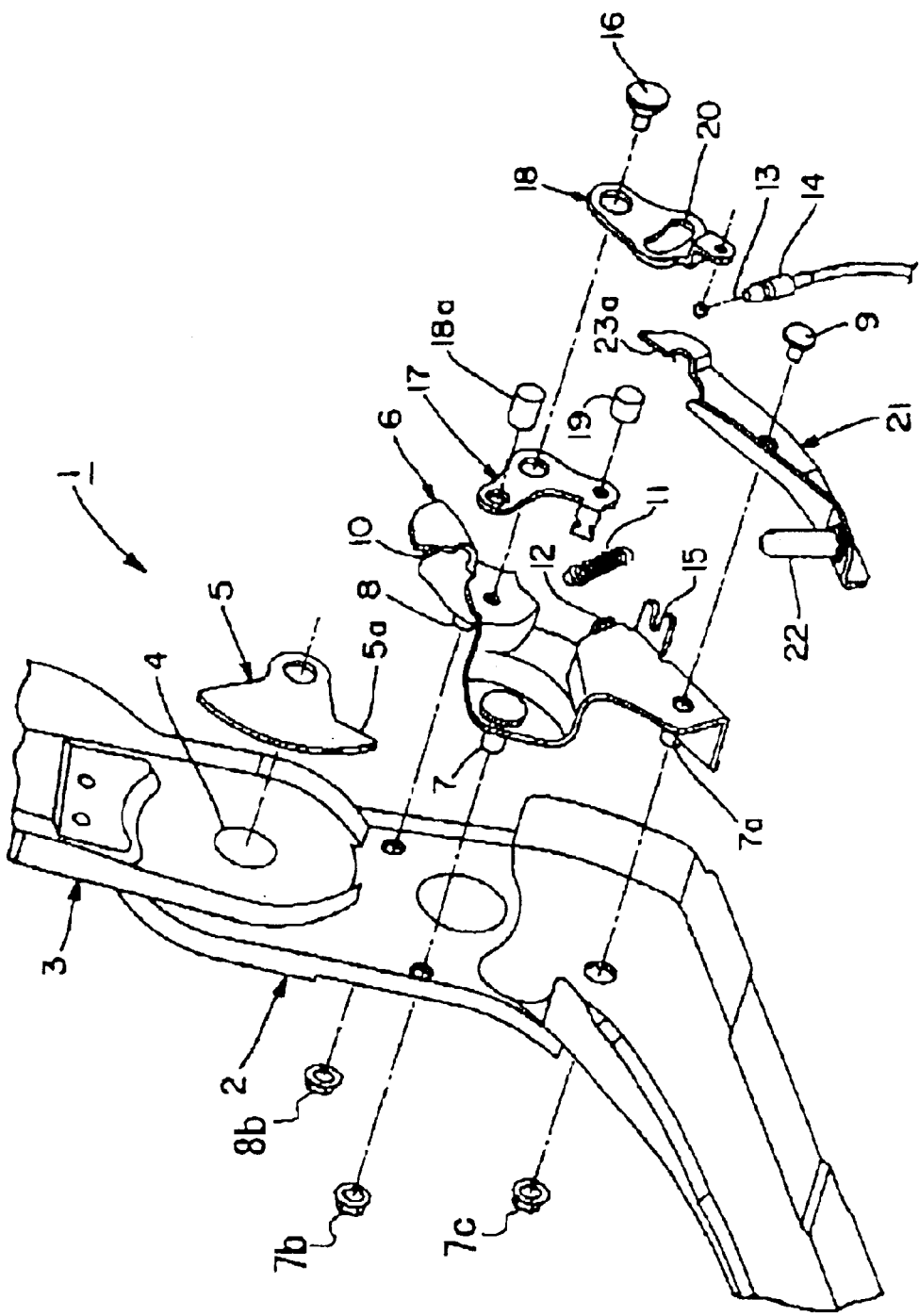
FIG. 1 is an exploded perspective view of a seat device of the first aspect of the present invention.

FIG. 1 is an exploded perspective view of the first embodiment of a seat device according to the invention.

A lower arm 2 forming a part of a seat cushion of a seat device 1 supports an upper arm 3 forming a part of seatback in a declining or reclining manner about a pin 4 in forward and backward directions.

In the Figs, only one side of a symmetrically disposed pair of the lower arm 2 and upper arm 3 is Indicated. A pin 4 supports a rotary member 5 which is made of a plate having a approximately triangle shape, and the rotary member 5 has a contact portion 5a and is rotatable about the pin 4 fixedly together with the upper arm 3.

A base bracket 6 is fixed on an inside surface of the lower arm 2 by utilizing bolts 7, 7a. 8 and corresponding nuts 7b, 7c, 8b. The base bracket 6 is positioned under the upper arm 3. The base bracket 6 has a stopper portion 10 facing to the inside surface of the upper arm 3 with a space, a hook segment 12 for supporting one end of a coil spring 11, and a supporting segment 15 for accepting an end support portion 14 of a cable 13. The first link member 17 and the second link member 18 are pivotally supported by a pin 16 in a lower position than the stopper portion 10. The stopper portion 10 has a shape of "L".

The first link member 17 has a shape of bell crank and supports pins 18a and 19 on both free end portions of the first link member 17. One end portion of the spring 11 is engaged with one of both free end portions. Consequently, the first link member 17 is biased by the spring 11 to turn in counterclockwise direction around the pin 16.

The second link member 18 has a long hole 20 nearly in the middle portion thereof, and accepts the pin 19. The pin 16 penetrates one end portion of the second link member 18, and the other end portion of the second link member 18 is connected with the end portion of the cable 13.

The other end portion of the cable 13 is connected with a lock mechanism (not shown) for adjusting the seat position in forward and backward.

A sensor link member 21 extending in forward direction is pivotally supported by a pin 9 on the base bracket 6. The sensor link member 21 has a contact bar 22 on the front end portion thereof. The contact bar 22 extends perpendicularly upward from the sensor link member 21, and the upper end of contact bar 22 is opposed to the bottom surface of the seat cushion 23. A connecting surface 23a formed on the rear end portion of the sensor link member 21 is opposed to the pin 19 on the first link member 17. The pin 19 is inserted into the long hole 20 of the second link member 18.

Figure 2:
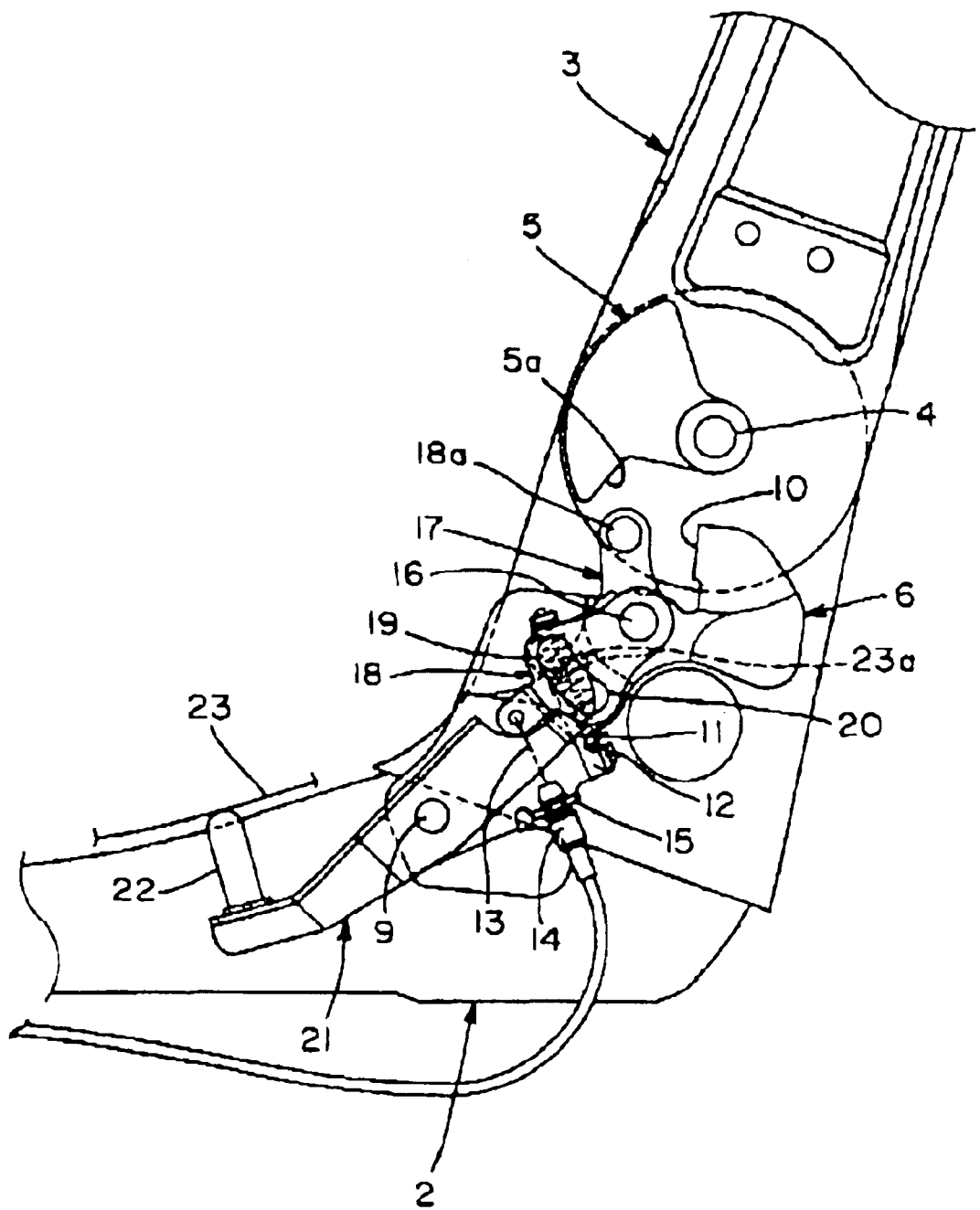
FIG. 2 is a side view that indicates respective part positions of the first aspect of the present invention at the time of seating.

As shown in FIG. 2, when a cushion 23 is set in sitting position, the seat cushion 23 pushes the contact bar 22 downward, and the sensor link member 21 is turned in counterclockwise direction around the pin 9. The connecting surface 23a pushes the pin 19 in upward direction. Accordingly, the first link member 17 turns in clockwise direction around the pin 16 against the force of the spring 11 and the pin 19 turns until the pin 19 gets in contact with the upper end portion of the long hole 20. Then, as shown in FIG. 2, the pin 18a of the first link member 17 comes within a locus of turn of the contact portion 5a of the rotary member 5.

Figure 3:
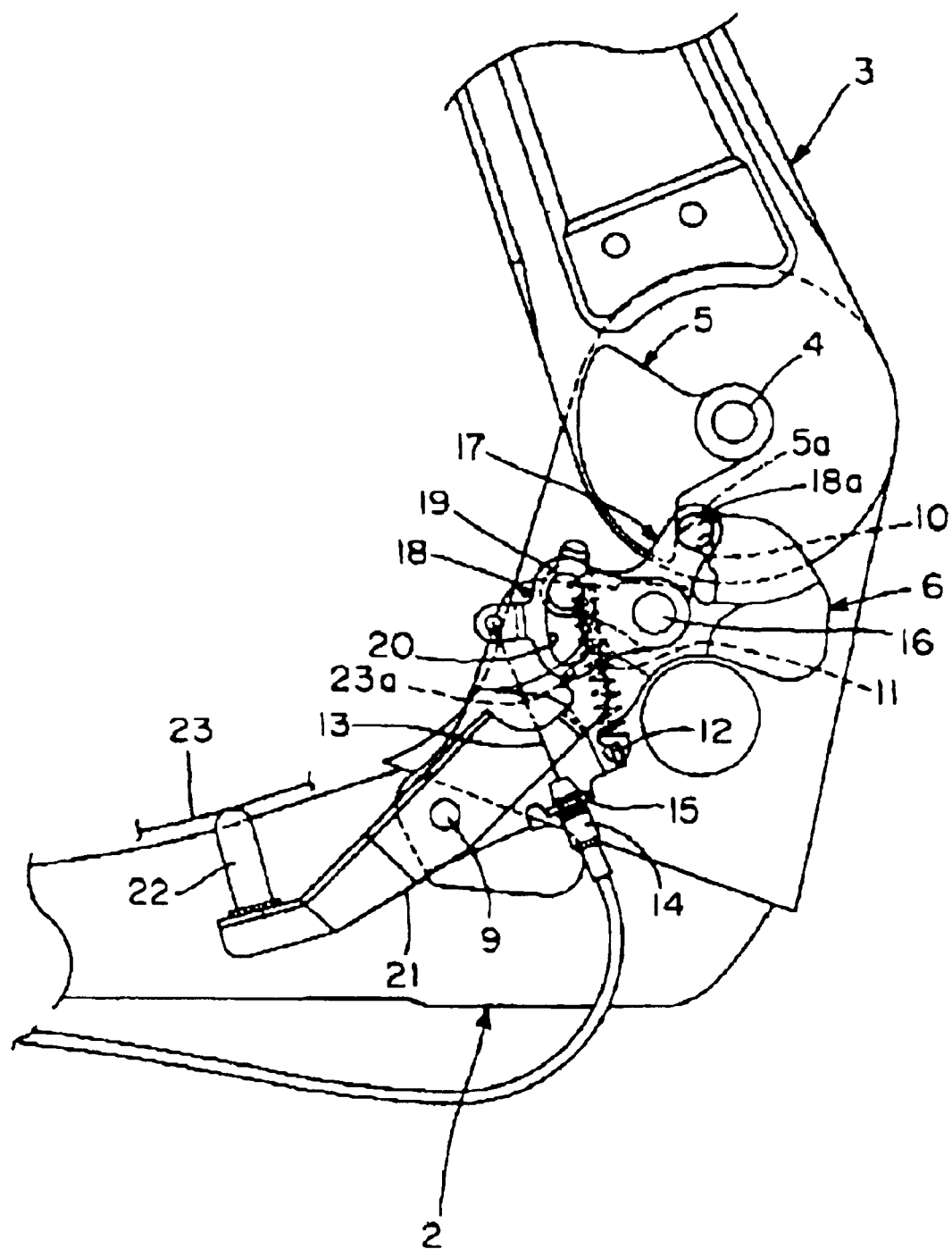
FIG. 3 is a side view that indicates respective part positions of the first aspect of the present invention at the time of performing a walk-in operation.

In FIG. 3, the seat device in a walk-in operation condition is indicated. When the seatback is turned in forward direction for the walk-in operation, the upper arm 3 turns in counterclockwise direction, the contact portion 5a of the rotary member 5 gets in contact with the pin 18a, the pin 18a is moved in the same direction with the contact portion 5a, and the pin 18a also gets in contact with the stopper portion 10 of the base bracket 6. Accordingly, the movement of the upper arm 3 is stopped by the stopper portion 10 and maintained in the walk-in position as shown in FIG. 3.

The first link member 17 with the pin 18a, as an intervening member to transfer the movement of the upper arm 3 to the cable 13, is turned in clockwise direction around the pin 16. Then, the second link member 18 is turned in the same direction with the first link member 17 by the pin 19. Consequently, the cable 13 is pulled, and the lock mechanism (not shown) is released, as a result the front seat position can be moved in forward direction.

Figure 4:
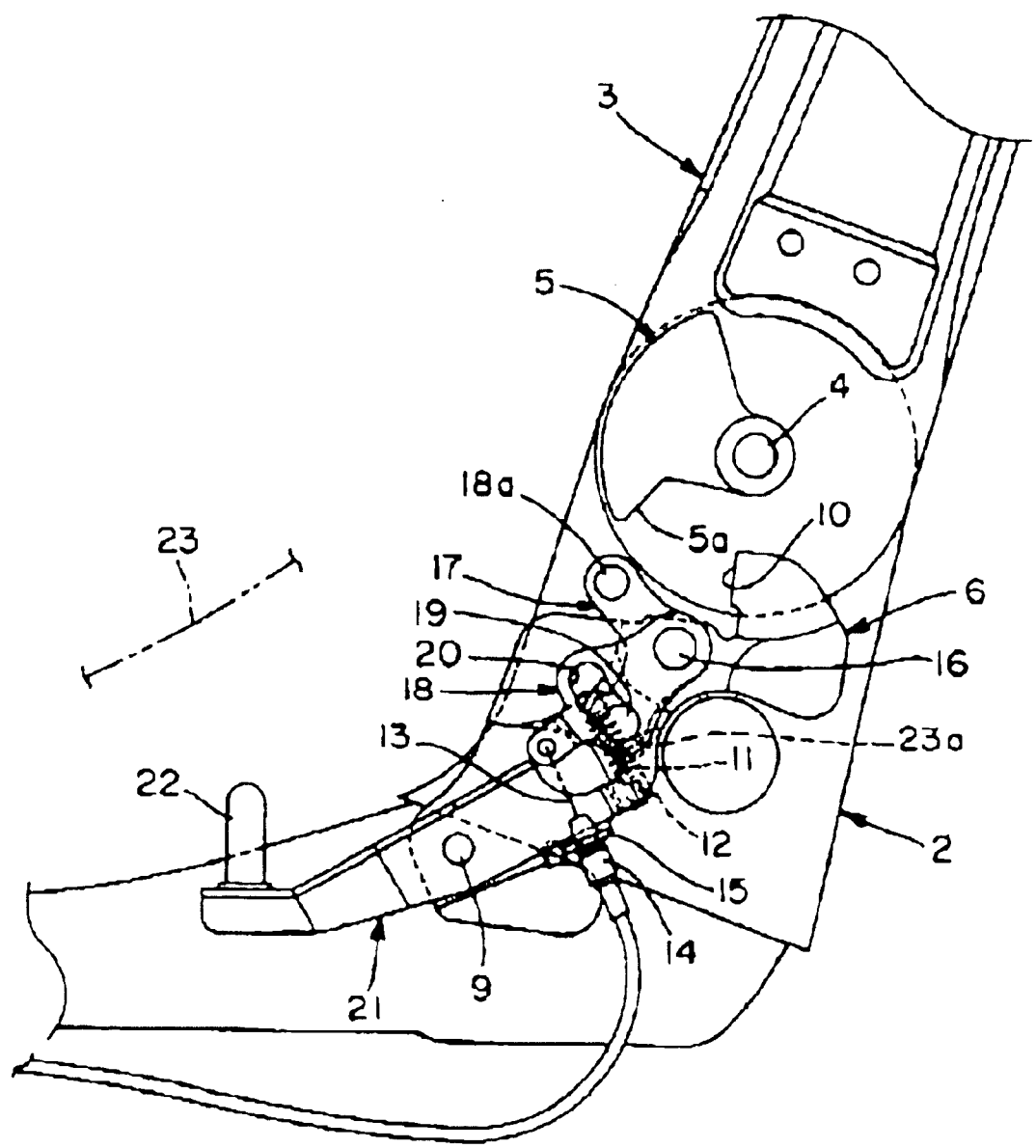
FIG. 4 is a side view that indicates respective part positions of the first aspect of the present invention when cushion material is removed.

As shown in FIG. 4, for the fold down operation, the seat cushion 23 is held up from the seating position by rotating the seat cushion 23 around a hinge portion (not shown in the drawing) located on a front portion thereof.

By holding up the seat cushion 23, the contact bar 22 is released from the contact on the bottom surface the seat cushion 23, and the first link member 17 is turned around the pin 16 in counterclockwise direction by the spring 11. The pin 19 moves down the connecting surface 23a and the sensor link member 21 turns in clockwise direction around the pin 9.

The rotation of the first link member 17 in counterclockwise direction is limited by engagement of the pin 19 on the end portion of the long hole 20. When the first link member 17 is stopped, the pin 18a is positioned outside the locus of the turn of the rotary member 5, and the walk-in is not operated.

Figure 5:
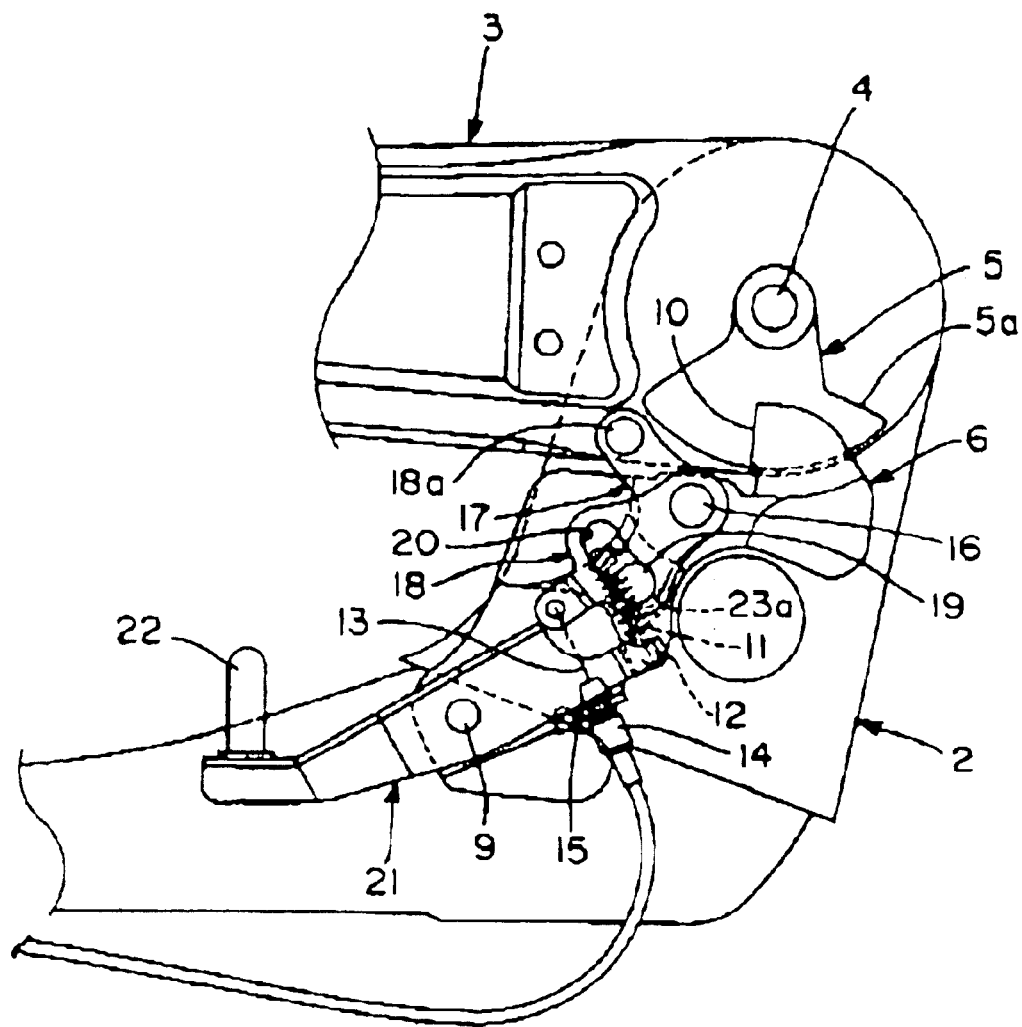
FIG. 5 is a side view that indicates respective part positions of the first aspect of the present invention when a seatback is turned in the flat direction.

As shown in FIG. 5, the seatback is turned in forward direction with large angle, the pin 18a gets out of the locus of the contact portion 5a of the rotary member 5 and thus the rotary member 5 can turn backward without engaging with the stopper portion 10 of the base bracket 6. Consequently, the seatback can be folded down to a flat position where the seat cushion was.

Accordingly, it becomes easy to load in or unload a baggage on or from the space behind the seat.

As shown in FIG. 3, when the walk-in operation is completed, and after the passenger sits on or get out from the rear seat, the seatback is restored in backward to the seating position. In this operation, following the movement of the rotary member 5, the pin 18a moves by the spring 11, and the position of each member is restored to the condition shown in FIG. 2.

When the seatback is moved back to the seating position from the fold down condition shown in FIG. 5, the condition shown in FIG. 4 is restored. Then, the condition of FIG. 2 is restored, when the seat cushion 23 is set in the seating position.

The a second embodiment according to this invention is shown in FIGS. 6 to 9. Step portions 25 and 26 as contact portions are formed in the circumferential surface of the end portion of an upper arm 24, and a small circumferential surface 28 with a radius from a center point of a pin 27 is formed.

A projecting portion 30 positioned in the side (the outside portion of a locus) portion of the turning locus of the step portion 25 and a base bracket 32 having a stopper 31 positioned within the locus are fixed to a lower arm 29. The base bracket 32 has a long hole 33.

The central point of the first link member 34 having the shape of "L" is pivotally supported by a pin 35 on the base bracket 32.

A roller 36 which can roll on circumferential surface 28 is installed on one end of the first link member 34. A cable 37 is connected to the other end of the first link member 34.

A spring 41 is connected to the base bracket 32 on the one end thereof, and the other end is connected to the first link member 34. Thus, the first link member 34 is biased to turn in clockwise direction, and the rolling of the roller 36 on the circumferential surface 28 is maintained.

A cable 37 is connected to a fold down lever (not shown) installed in the seatback.

One end of the second link member 38 is pivotally supported by the first link member 34 by a pin 39 at a portion between the pin 35 and the roller 36, and a pin 40 disposed on the other end of the second link member 38 is inserted in the long hole 33.

Figure 6:
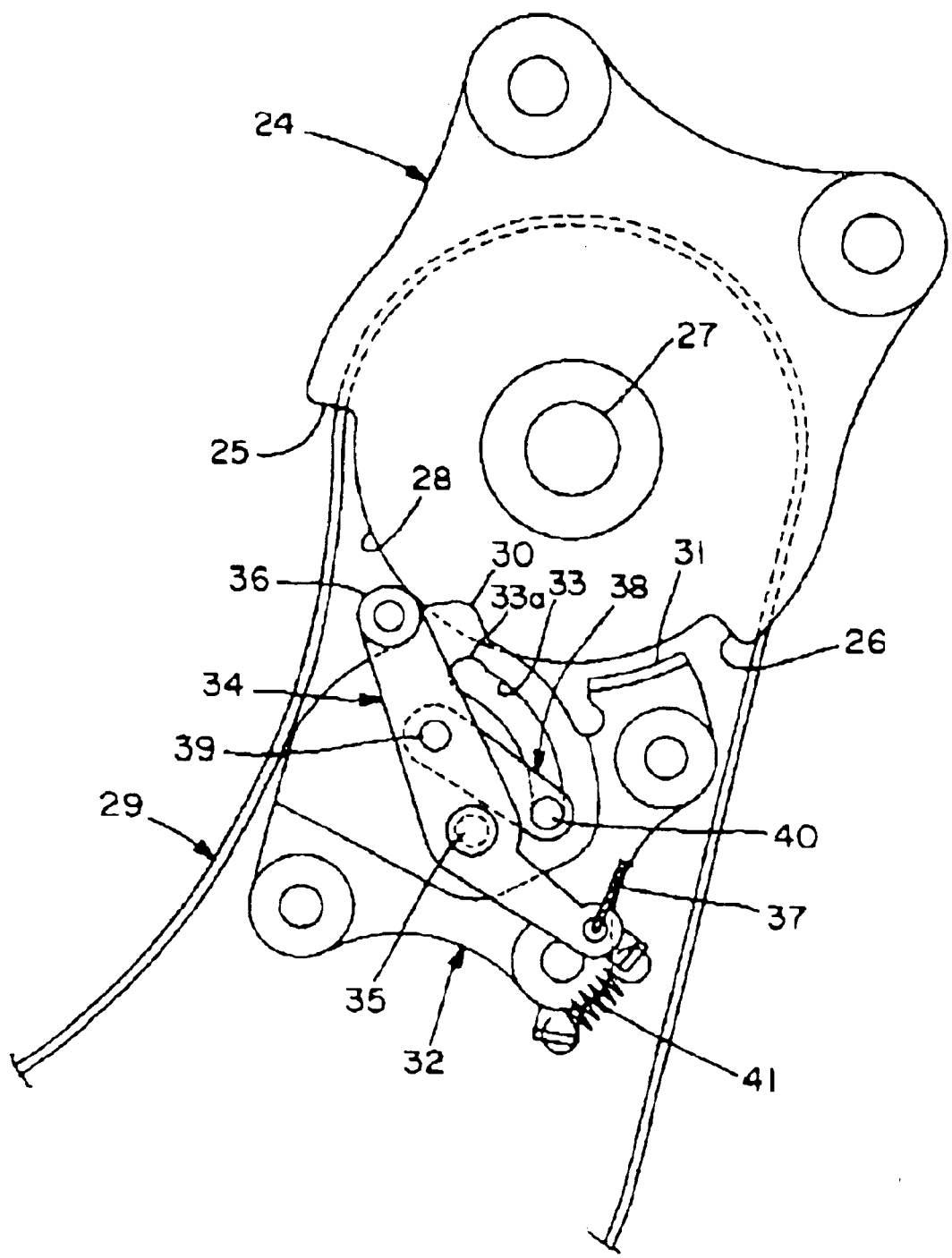
FIG. 6 is a side view that indicates a seat position of the second aspect of the present invention.

When the seat device is set in a seating position as shown in FIG. 6, the roller 36 contacts on the circumferential surface 28 and also contacts on a projecting portion 30. A pin 40 is located in a lower position of the long hole 33.

Figure 7:
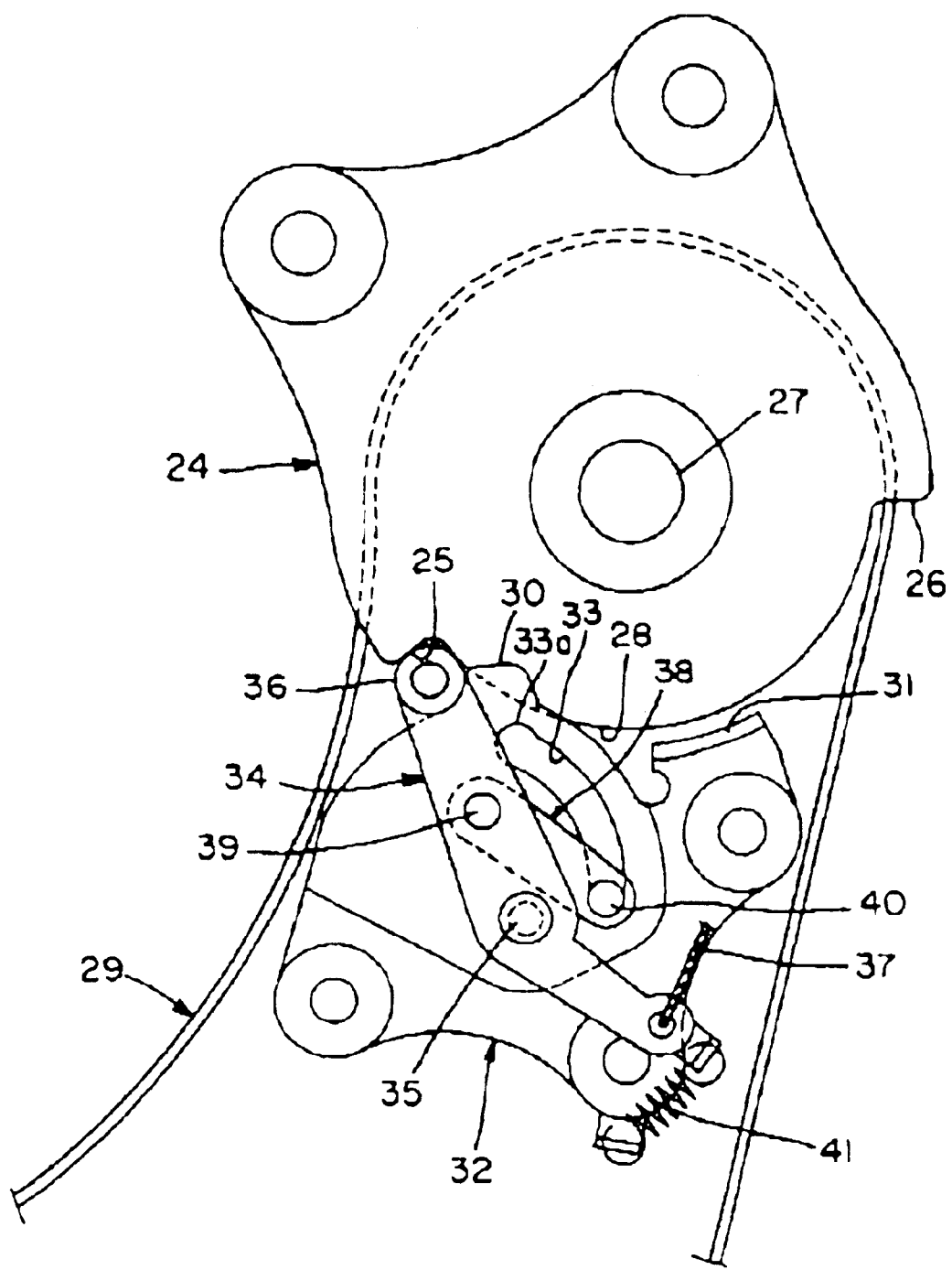
FIG. 7 is a side view that indicates respective part positions of the second aspect of the present invention at the time of performing the walk-in operation.

As shown in FIG. 7, when the seatback is turned down in the forward direction for the walk-in operation, since the stop portion 25 gets in contact with the roller 36. Since the movement of the roller 36 is stopped by the projecting portion 30, the seatback is also stopped and maintained in the position shown in FIG. 7. In this operation, the step portion 25, the projecting portion 30, and the roller 36 function as stoppers for stopping the movement of the seatback.

In order to achieve a fold down condition, that is to say, to make the seatback be in the flat condition by large turning angle of the seatback in the forward direction, a seat cushion (not shown) is held up by rotating around a hinge portion located on a front portion thereof. Then an operation lever (not shown) is pulled and the cable 37 is pulled then the first link member 34 turns in counterclockwise direction around the pin 35 against the force of the spring 41 and the roller 36 is rotated with large angle and moved outside of the locus of the step portion 25. The second link member 38 is guided by the long hole 33 and moved to the position shown in FIG. 8 in accordance with the movement of the first link member 34.

Figure 8:
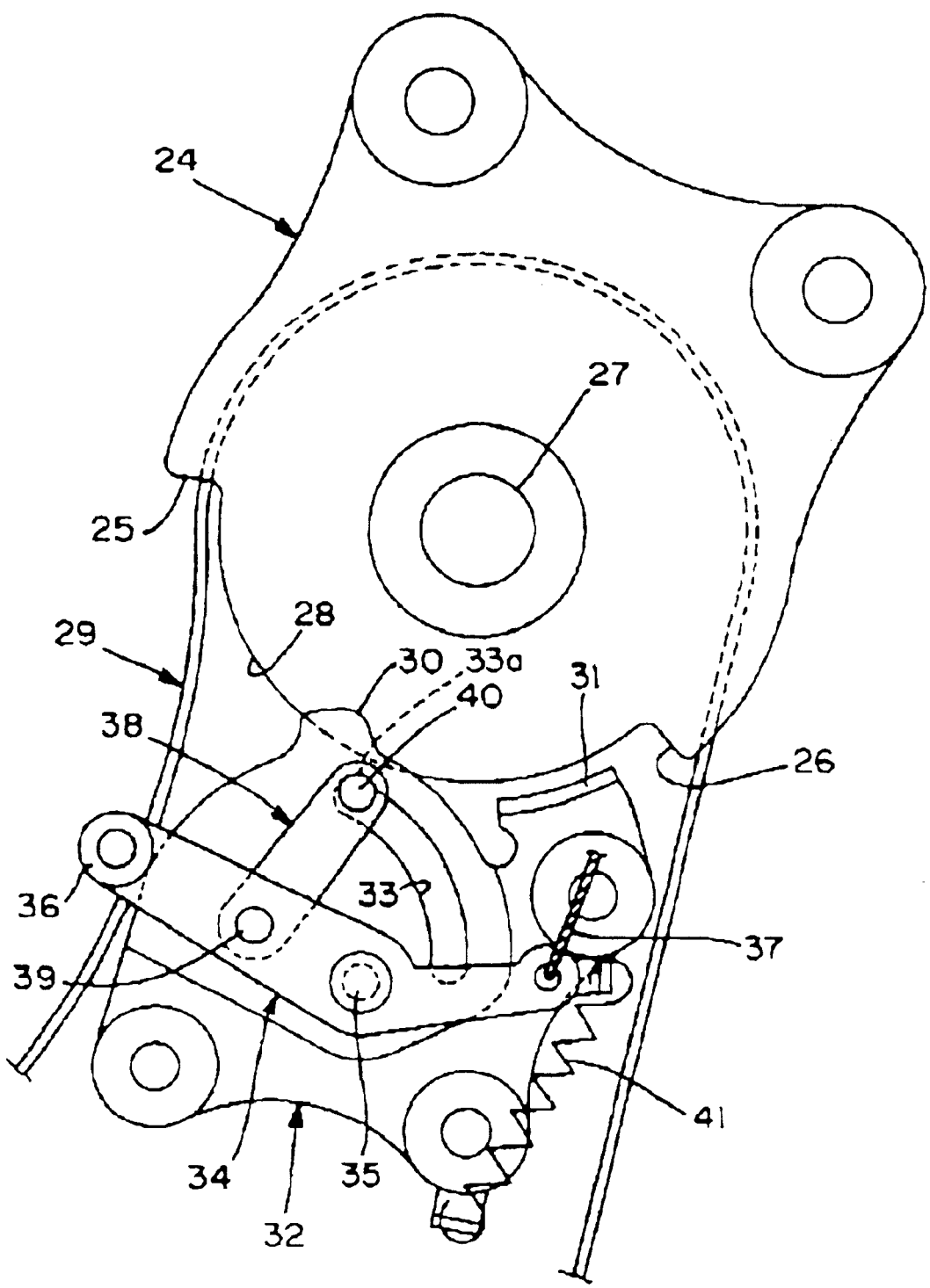
FIG. 8 is a side view that indicates respective part positions of the second aspect of the present invention when the seatback is turned down in the forward direction on a large scale.

When the operation lever is released in the condition shown in FIG. 8, the pin 40 of the second link member 38 is engaged in a shallow concave portion 33a formed on an end portion of the long hole 33 and the position of the second link member 38 is maintained.

When the seatback is turned down in forward direction with large angle, the step portion 25 passes by the side surface of the projecting portion 30 and moves in counter-clockwise direction, and the step portion 25 pushes a pin 40 in clockwise direction. The step portion 25 gets in contact with the side of the stopper 31 positioned within its locus, and thus the movement of the upper arm 24 is controlled. Since the step portion 25 gets in contact with the stopper 31, the flat condition of the seatback is maintained.

When the position of the seatback of FIG. 7 is restored to the seating position after the walk-in operation, the roller 36 gets in contact on the projecting portion 30 and the seating condition shown in FIG. 6 is restored.

Figure 9:
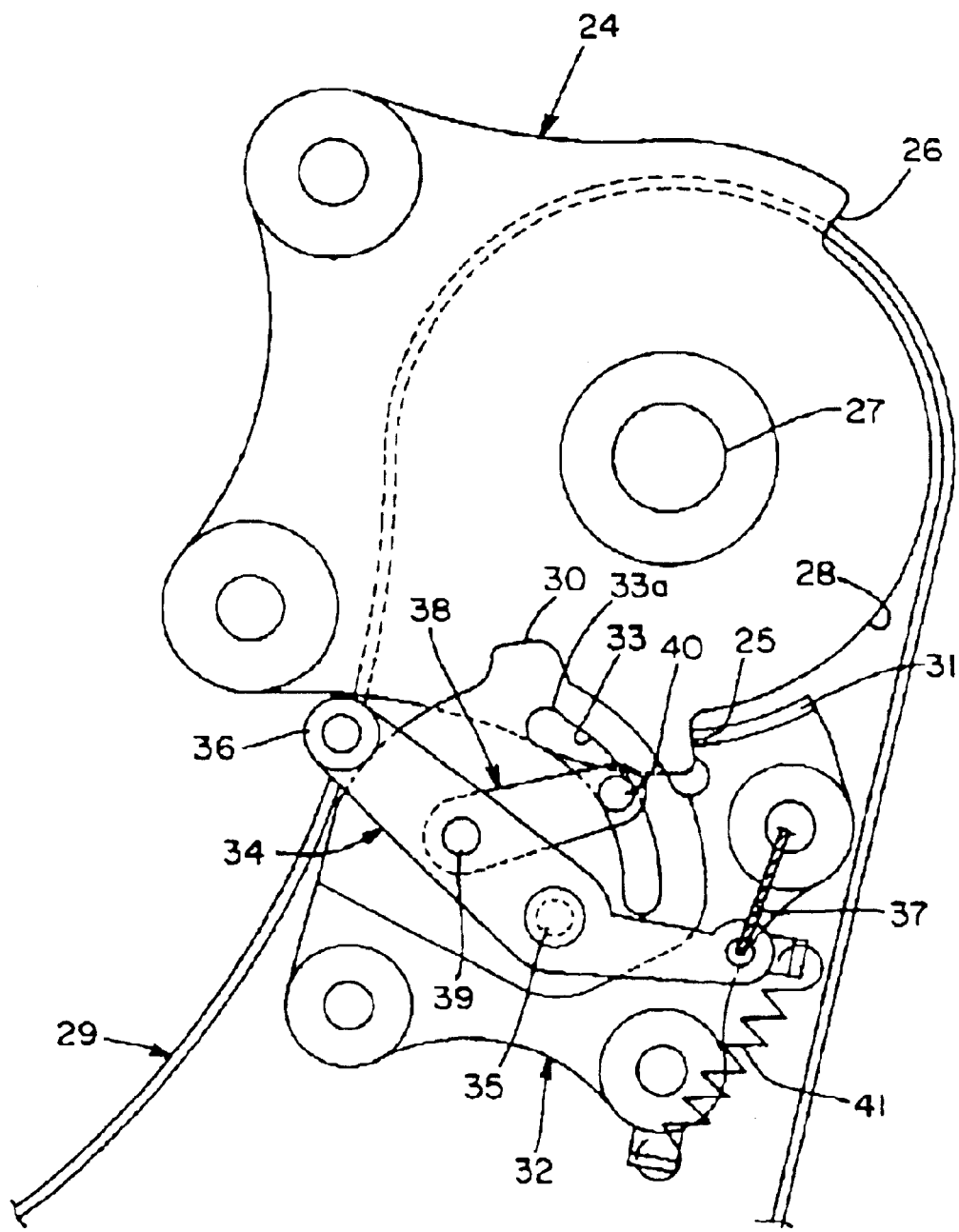
FIG. 9 is a side view that indicates respective part positions of the second aspect of the present invention when the seatback is turned in the flat direction.

When the seatback is turned back from the condition shown in FIG. 9, that is from the flat condition, the condition shown in FIG. 8 is restored. In this operation, the first link member 34 is turned in clockwise direction by the spring 41, and then the roller 36 comes to get in contact with and slide on the circumferential surface 28.

In the embodiments shown in FIGS. 6 to 9, a pair of the first link members 34, and a pair of the second link members 38 and a pair of the base bracket 32 are preferably provided on the both sides of the upper arm 24, and the each first link member 34 each second link members 38 are connected by the pin 35 and the roller 36. Then, the cable 37 is connected to one of the first link member 34. In such a structure, the load applied on the roller 36 can be supported by the pair of the first link members 34. And when the seatback is in the flat condition as shown in FIG. 9, the load applied by the step portion 25 on the stopper portions 31 can be dispersed to the pair of base brackets 32.

As obviously indicated in the first and second embodiments of the Figs. by holding up the seat cushion or by operating the lever, the pin or the roller which functions as an intervening portion can be moved out of the turning locus of the step portion formed on the upper arm or the turning member of the upper arm. Accordingly, the seatback can be turned down in the forward direction, and the seatback can be turned in the flat direction easily. In the first embodiment shown in FIGS. 1–5, the sensor link member 21 is an example of one form of an activating member while in the other embodiment shown in FIGS. 6–9, the cable 37 is an example of one form of an activating member. of the step portion formed on the upper arm or the turning member of the upper arm. Accordingly, the seatback can be turned down in the forward direction, and the seatback can be turned in the flat direction easily.

What is claimed is:

1. A seat device including an upper arm which can be turned in forward and backward directions around a lower arm, comprising:
   a contact portion provided in said upper arm;
   a base bracket fixed to said lower arm and having a stopper;
   a first link member pivotally supported by said base bracket and having an intervening portion; and
   an activating member for activating said first link member,
   wherein the intervening portion provided on the first link member is moved within a locus of movement of said contact portion upon performing a walk-in operation in which forward movement of the seat device is permitted and the intervening portion is moved out from the locus of said movement by activating the activating member to permit a seatback to be turned down in forward direction with large angle.

2. The seat device according to claim 1, further comprising:
   a spring one end of which is connected to the lower arm or base bracket and other end of which is connected to the first link member.

3. The seat device according to claim 2, further comprising:
   a second link member having a long hole and being rotatable relative to the first link member;
   a pin fixed on the first link member and inserted in the long hole; and
   a contact bar located on the activating member and arranged to be pressed by a seat cushion,
   wherein, when the contact bar is pressed by the seat cushion, the activating member moves the pin of the first link member to one end of the long hole and moves the intervening portion within the locus of movement of the contact portion, and when the contact bar is released from being pressed by the seat cushion, the pin of the first link member moves to another end of the long hole and moves the intervening portion out of the locus of said movement of the contact portion by an activating force of said spring.

4. The seat device according to claim 2, further comprising:
   a second link member one end of which is connected to the first line member and another end of which has a pin;
   wherein said pin is inserted in a long hole of the base bracket, the first link member moves the intervening portion towards inside of said locus of the movement of the contact portion by an activating force of the spring, and when the activating member is activated, the first link member turns and said second link member is guided by the pin along the long hole and then turns, and the intervening portion moves out of said locus of the movement of the contact portion against the activating force of said spring.

5. The seat device according to claim 4, wherein:
   said activating member has a cable connected to the first link member and the first link member moves the intervening portion out of the locus of said movement of the contact portion when said cable is pulled.

6. The seat device according to claim 5, wherein:
   said contact portion is formed in a shape including a step portion provided on a circular portion of said upper arm and a stopper portion of the base bracket is located on the locus of the movement of the step portion.

7. The seat device according to claim 6, wherein:
   the base bracket has a projecting portion and the step portion allows the intervening portion to get in contact with the projecting portion so as to make a walk-in operation.

8. The seat device according to claim 2, wherein:
   said contact portion is provided in a rotary member being fixed to said upper arm and said rotary member slides freely through a side surface of a stop portion of said base bracket.

9. The seat device according to claim 8, wherein: said contact portion moves said intervening portion toward said stopper so as to make the walk-in condition.

10. The seat device according to claim 8, wherein:
a cable is connected to a second link member and said cable is connected to a seat lock mechanism.

11. A seat device operable to effect a walk-in operation in which the seat device moves in a forward direction to facilitate passenger entry comprising:
a lower arm;
an upper arm supported on the lower arm and forming part of a seatback adapted to be moved in forward and backward directions;
a contact portion provided at the upper arm and movable along a locus of movement;
a base bracket provided at the lower arm;
a first link member pivotally supported at the base bracket and having an intervening portion;
an activating member for activating said first link member; and
the intervening portion being movable through operation of the activating member between one position in which the intervening portion is located within the locus of movement of the contact portion so as to be contacted by the contact portion when the seatback is moved in the forward direction to effect the walk-in operation and another position in which the intervening portion is located outside the locus of movement of the contact portion to permit the seatback to be turned down in the forward direction through a large angle.

12. The seat device according to claim 11, further comprisng a spring having one end connected to the lower arm or the base bracket an another end connected to the first link member.

13. The seat device according to claim 22, further comprising:
a second link member rotatable relative to the first link member and provided with an elongated hole;
a pin fixed on the first link member and positioned in the elongated hole;
a contact bar located on the activating member and adapted to be moved by a pressing force applied by a cushion; and
the activating member acting on the first link member when the cushion applies the pressing force to. the activating member to move the pin to one end of the elongated hole and move the intervening portion within the locus of movement of the contact portion, and upon release of the pressing force applied to the activating member by the cushion the first link member moves under an urging force of the spring to move the pin of the first link member to an opposite end of the elongated hole and to move the intervening portion out of the locus of movement of the contact portion.

14. The seat device according to claim 12, further comprising:
a second link member having one end connected to the first link member and another end provided with a pin, said pin being positioned in an elongate hole of the base bracket;
an urging force of the spring urging the first link member in a direction causing the intervening portion to move towards inside the locus of movement of the contact portion, and operation of the activating member causing the first link member to turn in opposition to the urging force of the spring while the second link member is guided by the pin along the elongated hole to move the intervening portion out of the locus of movement of the contact portion.

15. The seat device according to claim, 14, wherein the actiating member includes a cable connected to the first link member, the first link member moving the intervening portion out of the locus of movement of the contact portion when the cable is pulled.

16. The seat device according to claim 15, wherein the contact portion is formed as a step portion provided on a circular peripheral portion of the upper arm, and a stopper portion of the base bracket is located on the locus of movement of the step portion.

17. The seat device according to claim 11, wherein the contact portion is provided in a rotary member fixed to the upper arm, and the rotary member sliding freely through a side surface of a stop portion of the be bracket.

18. The seat device according to claim 17, wherein the contact portion moves the intervening portion toward the stopper to effect the walk-in condition.

19. The seat device according to claim 17, wherein a cable connected to a seat lock mechanism is connected to a second link member.

* * * * *